(No Model.)

W. H. WHEELER.
CLAMP FOR TANK AND OTHER HOOPS.

No. 261,504. Patented July 18, 1882.

Witnesses:
Frank H. Blanchard
D. H. Fletcher

Inventor:
William H. Wheeler
By Hill & Dixon
Attorneys.

UNITED STATES PATENT OFFICE.

WILLIAM H. WHEELER, OF BELOIT, WISCONSIN, ASSIGNOR TO THE ECLIPSE WIND ENGINE COMPANY, OF SAME PLACE.

CLAMP FOR TANK AND OTHER HOOPS.

SPECIFICATION forming part of Letters Patent No. 261,504, dated July 18, 1882.

Application filed March 13, 1882. (No model.)

*To all whom it may concern:*

Be it known that I, WILLIAM H. WHEELER, of Beloit, in the county of Rock and State of Wisconsin, have invented a new and useful Improvement in Clamps for Tank and other Hoops, of which the following is a description, reference being had to the accompanying drawings, in which—

Figure 1:
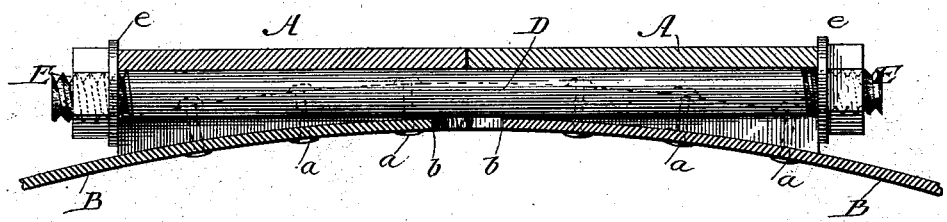
Figure 2:
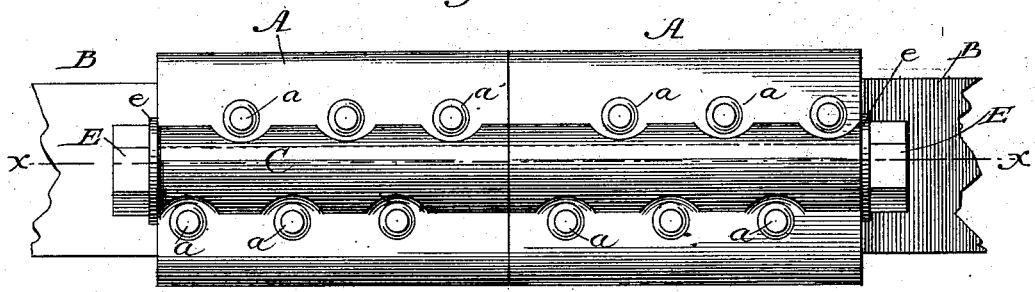
Figure 3:
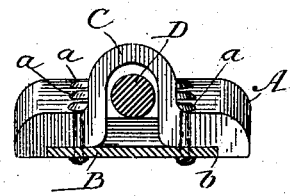

Figure 1 is a longitudinal sectional view cut through the line $x\,x$, Fig. 2. Fig. 2 is a plan view, and Fig. 3 is an end view, the nut upon the draw-bolt being removed.

Like letters of reference indicate like parts in the different figures.

The object of my invention is to provide a simple and effective device for attaching or clamping together the ends of tank and other hoops; and it consists in the provision of a pair of clamps attached to the ends of the hoop, and in various details in the construction of the same, all of which will be hereinafter more fully described, and pointed out definitely in the claims.

In the drawings, A A, Figs. 1 and 2, represent the two halves of my improved clamp, preferably cast in metal, and to which the ends of the hoop B B, encircling the tank or other object to be clamped, are securely attached by the rivets $a\,a$. As shown in Figs. 2 and 3, the clamp A is made wider than the hoop B, in order to give the former the proper strength, and is provided with flanges or projections upon its under side, forming a recess, $b$, within which the end of the hoop is secured by the rivets $a\,a$. This form of construction not only presents a more finished appearance, aside from bringing the line of tension of the hoop as nearly as possible into coincidence with the clamp, but it also produces a smooth and even under surface, and effectually prevents the ends of the hoop from becoming embedded in the tank when the clamp is tightened, thus overcoming a serious difficulty attendant upon the use of former modes of tightening hoops. The under side of the clamp is made concave, and is intended to fit the contour of the tank or object encircled by the hoop. The clamp A is provided with an upward projection extending longitudinally along its center, forming beneath the same a longitudinal recess, C, arched in cross-section, the upper portion of which recess extends longitudinally in a straight line, as shown in Fig. 1, but the base of the same conforms to the concavity of the clamp, the dome of the arched recess being higher at the ends than at the center or point of junction. Within the arched recess C, I insert a bolt, D, for the purpose of connecting the two halves of the clamp. On the respective ends of the bolt D, I cut threads and place the nuts E E, preferably with washers $e\,e$ intervening between them and the outer ends of the clamp A A.

When the hoop B is placed in position over the object to be clamped and the bolt D inserted in the arched recess C of the clamp, it is obvious that the tightening of the nuts E E must draw the ends of the clamp toward each other with powerful force, while the tension upon the bolt serves to keep the latter straight, this tendency increasing in proportion to the strain, and said bolt, bearing at its center upon the dome of the arch, serves to hold the meeting ends of the clamp outward from the object clamped, and prevents them from "digging" or embedding themselves therein, as would occur but for the peculiar form of the arched recess above described.

The construction above set forth and described is a very effective device for uniting the ends of hoops upon tanks and other objects, as actual tests have shown that it possesses great strength and durability, and can at will be adjusted to any degree of tension upon the hoop, which is drawn into the required position and held in place without the possibility of its ends digging into the sides of the tank or otherwise marring its surface. This form of clamp also renders the strength of the hoop at the point of junction equal to its strength at any other point in its circumference.

Having thus described my invention, what I claim, and desire to secure by Letters Patent, is—

1. A device for uniting the ends of hoops for tanks and other purposes, consisting of the combination of a clamp, provided with a longitudinal arched recess, and a draw-bolt inserted therein, for the purpose of tightening the same, substantially as described.

2. A clamp for tank and other hoops, provided with flanges or projections upon its under side, forming a recess for the insertion therein of the end of the hoop, substantially as described.

3. A clamp for uniting the ends of tank and other hoops, provided with a longitudinal arched recess for the reception of the draw-bolt, which arched recess is deeper at the ends than at the point of union, substantially as and for the purpose set forth.

4. The combination of a clamp for tank and other hoops, provided with flanges or projections upon its under side, forming a recess for the insertion therein of the ends of the hoop, and also provided with a longitudinal arched recess having its outer ends deeper than at the point of union, with a draw-bolt inserted therein and a hoop attached thereto, substantially as described.

WILLIAM H. WHEELER.

Witnesses:
D. H. FLETCHER,
DAVID FLETCHER.